Patented Feb. 10, 1925.

1,526,297

UNITED STATES PATENT OFFICE.

ROBLEY H. MORRISON, OF AKRON, OHIO, ASSIGNOR TO THE GOODYEAR TIRE & RUBBER COMPANY, OF AKRON, OHIO, A CORPORATION OF OHIO.

PROCESS OF MAKING RUBBERIZED FIBER COMPOSITION.

No Drawing. Application filed December 12, 1921. Serial No. 521,907.

*To all whom it may concern:*

Be it known that I, ROBLEY H. MORRISON, a citizen of the United States, residing at Akron, in the county of Summit and State of Ohio, have invented new and useful Improvements in Processes of Making Rubberized Fiber Composition, of which the following is a specification.

My invention relates to a rubberized fiber composition which may be utilized in a variety of capacities, such as for floor or wall coverings, as a substitute for leather, or containers of liquids or of moist materials, or for any purpose to which a tough, flexible body may be adapted.

The invention resides broadly in so treating fibers as to produce therefrom a hydration product of cellulose, which assists in subsequently bonding or uniting the fibers to produce a mat of relatively high tensile strength.

In addition to the agglutinant or cellulose product that bonds the fibers, a vulcanizable material is utilized to form a matrix in which the united fibers are embedded. A mat of material is thus produced, after vulcanization, which is very durable.

The fibers that are utilized may be of a wide variety. For example, I may use cotton, linen, hemp, manila, jute, or wood fibers as prepared for paper making, or any felting material, such as hair, fur or other material of a like nature. As the vulcanizable material, I may employ rubber, or other similar substances, which may be readily dissolved and precipitated from a solution upon the fibers and which, furthermore, is susceptible to vulcanization with sulfur by heat, or by any other suitable method.

One method of preparing the fibers to produce an article in accordance with my invention is to first beat the fibers in water, which is in sufficient quantity to enable the beating action to thoroughly separate and distribute the fibers throughout the water. In order to beat the fibers, any suitable or well known machine, such, for example, as employed for a similar purpose in the paper industry, may be utilized. The beating of the fibers, furthermore, should be continued until the fibers are not only separated, but also a hydration product of cellulose is produced. If the beating action is carried to such an extent, it will be found that the fibers have their ends frayed or curled, which condition subsequently aids in producing a unitary mat of the fibers when they have been subjected to the proper treatment to prepare them therefor. After the fibers have thus been properly beaten in water, the next step is to remove this liquid, which may be accomplished either by washing out with alcohol or by drying, which may be followed by a short period of beating in alcohol. The excess alcohol is then filtered off and the fibers are mixed with a large volume of liquid solvent for rubber, such as benzol or gasoline, after which a solution of rubber is added from which the rubber is precipitated. It should be noted that the fibers are suspended in a relatively large volume of the rubber solvent and are, preferably, agitated therein to insure their dispersion throughout the liquid. The resulting separation of the fibers insures a satisfactory deposition of rubber upon the fibers during the subsequent precipitation.

The precipitation of the rubber may be caused by the addition to the mixture thus prepared of a non-solvent of rubber, such as alcohols, or ketones. The fibers may then be collected from the liquid by screening or by any other suitable method and subjected to heat to dry the collected material. Pressure may be utilized in addition to heat to properly shape the material and compact it while the fibers are being dried or after the fibers have been dried and are being prepared into a suitable commercial product by vulcanization of the precipitated rubber.

It is desirable to beat the fibers in a sufficient amount of liquid to insure their complete separation and to obtain the benefit of the beating action. In order to insure good results, I have found that one proportion of fibers to the weight of liquid taken should be from about 2% to 8% fibers to the weight of the liquid.

If the process is followed as above outlined, it will be found that a mat of material is produced in which the fibers are united in a plurality of ways. First, the fibers are mechanically interlocked by reason of their frayed or curled ends; second, they are united by an agglutinant; and third, they are embedded in a matrix or bed of vulcanized material. The above characteristics may be utilized in identifying the material produced in the manner described and such characteristics are clearly disclosed by microscopic examination.

Another method of producing the material, above described, is to utilize alcohol, acetone or methyl ethyl ketone in which the fibers are initially suspended and subjected to the beating action. However, if alcohol is employed, the production of the agglutinant or hydration product of cellulose is considerably reduced and, consequently, the ultimate bonding action thereof is materially decreased. However, the fibers may still be mechanically interlocked by reason of the frayed or curled ends that are produced in the beating action to separate the fibers, in addition to being embedded in the matrix of vulcanizable material. If the fibers are first beaten in alcohol, the excess alcohol may then be filtered off and the fibers mixed with a solvent for rubber, such as benzol, toluol xylol or gasoline, after which a solution of rubber may be added from which the rubber is subsequently precipitated upon the fibers. The fibers may then be screened or otherwise collected from the liquid and subjected to the drying and shaping process.

It will be appreciated that the quantity of rubber and dry pulp that is utilized depends to a great extent upon the ultimate requirements of the finished product. In order to give an example, however, I have found that in forming a substitute for leather in the making of soles or heels, that a mixture of approximately 33% dry rubber and 67% dry pulp insures very satisfactory results, although other proportions yield a material of high quality.

The material produced by the processes set forth herein is recognized by a mat of bonded fibers which are embedded in a matrix of rubber. The precipitated rubber is, of course, vulcanized by the heat that is subsequently applied and which causes the rubber to flow to produce the matrix. As above mentioned, in addition to being embedded in a matrix of vulcanized rubber, if the fibers are beaten in water they are also bonded by the hydration product of cellulose that is produced and their frayed or curled ends are interlocked when the fibers are agglomerated. The material resulting from the process of beating the fibers in alcohol has substantially the same characteristics, with the exception that the amount of hydration product of cellulose produced is relatively small and, consequently, its bonding action is greatly reduced. However, the fact that the fibers are mechanically interlocked by their frayed or curled ends, in addition to being embedded in a matrix of vulcanizable material, insures a product of sufficient mechanical strength for a wide variety of applications.

Although I have set forth in detail a plurality of processes that may be utilized to produce a material in accordance with my invention, it will be appreciated that some variations may be made in the processes without departing from the spirit or scope of my invention.

It will also be apparent that the invention is not confined to vulcanization by utilizing sulfur or a reaction effected by employing heat because it is possible to cure rubber by cold processes and to secure a flowing of the rubber by means of pressure. No restrictions should, consequently, be imposed upon the claims except as necessitated by the prior art and a reasonable interpretation of the disclosure.

What I claim is:

1. A method of treating vegetable fibers that comprises beating the fibers in a liquid adapted to fray and curl their ends and produce a hydration product of cellulose therefrom, suspending the fibers in a solvent for rubber, mixing a rubber solution therewith, precipitating the rubber upon the fibers, collecting the fibers from the liquid and vulcanizing the product to form a unitary article.

2. A method of treating vegetable fibers that comprises beating the fibers in a liquid adapted to fray and curl their ends and produce a hydration product of cellulose therefrom, suspending the fibers in a solvent for rubber, mixing a rubber solution therewith, adding a non-solvent of rubber to precipitate the rubber upon the fibers, collecting the fibers from the liquid and applying heat and pressure to the product.

3. A method of treating vegetable fibers that comprises beating the fibers in water to fray and curl their ends and to produce a hydration product of cellulose therefrom, removing the water, suspending the fibers in a solvent for rubber, adding a solution of rubber thereto, precipitating the rubber upon the fibers, collecting the fibers from the liquid and vulcanizing.

4. A method of treating vegetable fibers that comprises beating the fibers in water to fray and curl their ends and to produce a hydration product of cellulose therefrom, removing the water, suspending the fibers in a solvent for rubber, adding a solution of rubber thereto, mixing a non-solvent of rubber therewith to precipitate the rubber upon the fibers, collecting the fibers and applying heat and pressure thereto.

5. A method of treating vegetable fibers that comprises beating the fibers in water to fray and curl their ends and to produce a hydration product of cellulose therefrom, removing the fibers from the water, agitating the fibers in alcohol, draining off the excess alcohol, suspending the fibers in a solvent for rubber, mixing a solution of rubber therewith, precipitating the rubber upon the fibers, collecting the fibers from the liquid and vulcanizing.

6. A method of treating vegetable fibers that comprises beating the fibers in water to fray and curl their ends and to produce a hydrated product of cellulose therefrom, removing the fibers from the water, agitating the fibers in alcohol, draining off the excess alcohol, suspending the fibers in a solvent for rubber, mixing a solution of rubber therewith, adding a non-solvent for rubber to precipitate the rubber upon the fibers, collecting the fibers from the liquid and vulcanizing the resulting product.

In witness whereof I have hereunto signed my name in the presence of two subscribing witnesses.

ROBLEY H. MORRISON.

Witnesses:
 J. P. MAIDER,
 O. E. BEE.